United States Patent
Löhken et al.

(10) Patent No.: US 12,103,490 B2
(45) Date of Patent: Oct. 1, 2024

(54) SELF-REGULATING DAMPER UNIT

(71) Applicant: Stabilus GmbH, Koblenz (DE)

(72) Inventors: Lars Löhken, Linz am Rhein (DE); Raphael Piroth, Koblenz (DE); Markus Müller, Koblenz (DE); Ulrich Probst, Hillscheid (DE); Marcus Weber, Neuwied (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 17/999,597

(22) PCT Filed: May 21, 2021

(86) PCT No.: PCT/EP2021/063693
§ 371 (c)(1),
(2) Date: Nov. 22, 2022

(87) PCT Pub. No.: WO2021/239630
PCT Pub. Date: Dec. 2, 2021

(65) Prior Publication Data
US 2023/0219519 A1 Jul. 13, 2023

(30) Foreign Application Priority Data
May 25, 2020 (DE) .................. 10 2020 113 961.6

(51) Int. Cl.
*B60R 22/28* (2006.01)
(52) U.S. Cl.
CPC ........ *B60R 22/28* (2013.01); *B60R 2022/282* (2013.01); *B60R 2022/288* (2013.01)
(58) Field of Classification Search
CPC .. B62K 2201/08; F16F 9/5126; F16F 13/007; F16F 9/3221; F16F 9/585; B60G 17/08; B60R 22/185
(Continued)

(56) References Cited

U.S. PATENT DOCUMENTS

| 3,338,347 | A | * | 8/1967 | Avner | ................ F16F 9/061 188/317 |
| 3,889,969 | A | * | 6/1975 | Otani | ................ F16F 9/061 280/805 |

(Continued)

FOREIGN PATENT DOCUMENTS

| DE | 1985453 U | 5/1968 |
| DE | 1555491 A1 | 12/1969 |

(Continued)

OTHER PUBLICATIONS

Lohken,. DE102008008268A1 English Translation retrieved Dec. 1, 2023, published 2009 (Year: 2009).*

(Continued)

*Primary Examiner* — Drew J Brown
*Assistant Examiner* — Caitlin Anne Miller
(74) *Attorney, Agent, or Firm* — Kilpatrick Townsend & Stockton LLP

(57) ABSTRACT

A self-regulating damper unit comprising a cylinder having a first working chamber and a second working chamber, a piston, a piston rod, and a through-hole between the first working chamber and the second working chamber. The damper unit also comprises a shiftable weight which modifies a passage cross-section of the through-hole. The shiftable weight is movably mounted such that retardation of the piston causes enlargement of the passage cross-section. A seat belt unit comprises a seat belt and the damper unit.

18 Claims, 1 Drawing Sheet

(58) Field of Classification Search
USPC .......................................................... 280/805
See application file for complete search history.

(56) References Cited

U.S. PATENT DOCUMENTS

| | | | | |
|---|---|---|---|---|
| 4,254,849 | A | * | 3/1981 | Pohlenz .................. F16F 9/504 188/275 |
| 6,102,439 | A | * | 8/2000 | Smithson ................ B60R 22/28 280/805 |
| 6,196,589 | B1 | | 3/2001 | Smithson et al. |
| 8,302,746 | B2 | * | 11/2012 | Azekatsu .............. F16F 9/5126 188/322.15 |
| 2023/0193975 | A1 | * | 6/2023 | Probst .................... F16F 9/526 16/66 |

FOREIGN PATENT DOCUMENTS

| | | | |
|---|---|---|---|
| DE | 2139942 | B1 | 11/1972 |
| DE | 2517539 | A1 | 10/1975 |
| DE | 2758083 | A1 | 7/1979 |
| DE | 19709593 | A1 | 12/1997 |
| DE | 102008008268 | A1 * | 8/2009 ............ F16F 9/5126 |
| DE | 102011081496 | A1 | 2/2013 |
| DE | 102008008268 | B4 | 10/2021 |
| EP | 2180206 | A1 | 4/2010 |
| GB | 2011021 | A | 7/1979 |
| JP | 5999135 | A | 6/1984 |
| JP | 2018179091 | A | 11/2018 |

OTHER PUBLICATIONS

European Patent Application No. 21728867.9, Office Action mailed Sep. 26, 2023, 10 pages.
German Application No. 102020113961.6, "Search Report", Jan. 27, 2021, 4 pages.
International Application No. PCT/EP2021/063693, "International Search Report and Written Opinion", Jul. 8, 2021, 12 pages.

* cited by examiner

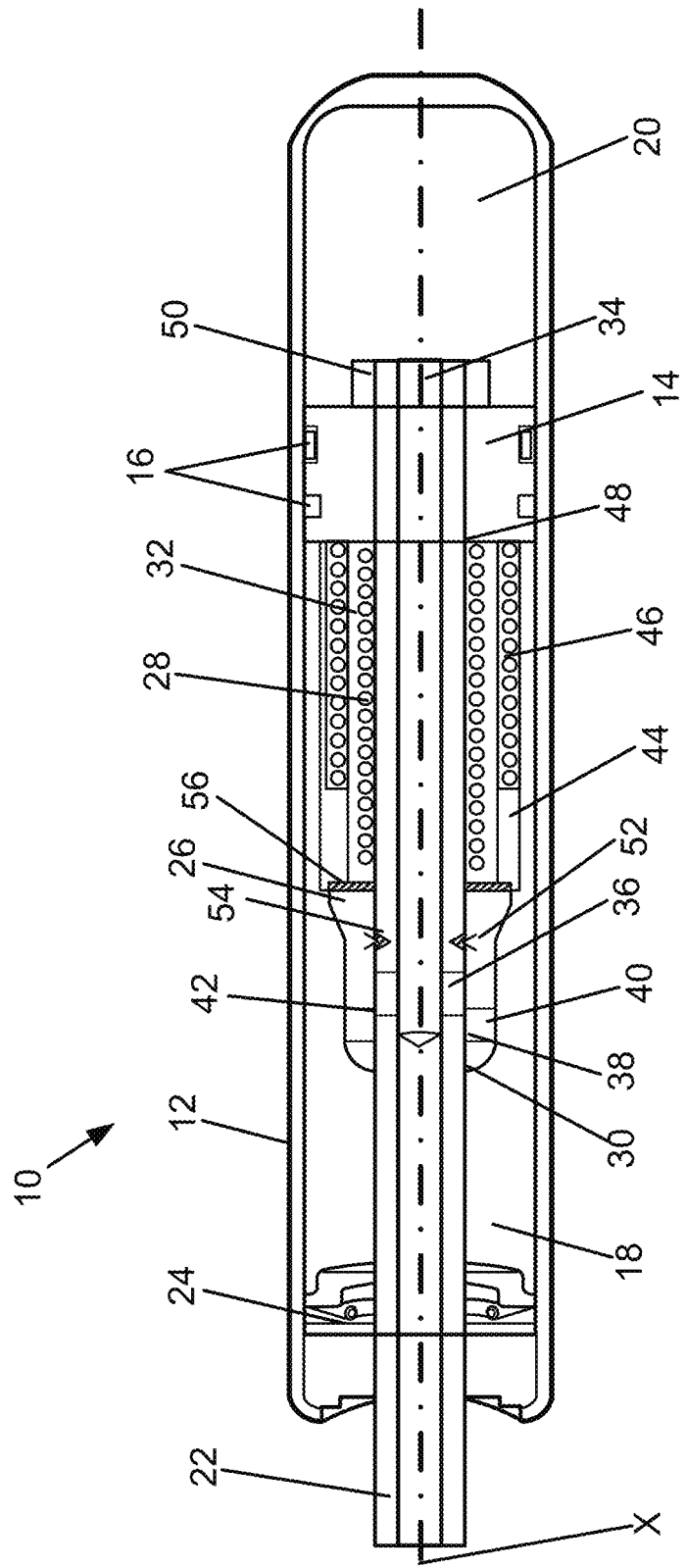

SELF-REGULATING DAMPER UNIT

CROSS REFERENCE TO RELATED APPLICATION

This application is a U.S. national phase of International Patent Application No. PCT/EP2021/063693 filed on May 21, 2021, which claims priority to German Patent Application No. 10 2020 113 961.6, filed in Germany on May 25, 2020. The entire contents of both applications are hereby incorporated herein by reference.

DESCRIPTION

The invention relates to a self-regulating damper unit comprising a cylinder which is filled with a fluid, a piston which divides the interior of the cylinder into a first working chamber and a second working chamber and which is displaceably disposed in the cylinder, a piston rod which is connected to the piston and which emerges from the cylinder at one end thereof, and at least one through-hole which is adapted to place the first working chamber in fluid communication with the second working chamber.

There are various applications in which it is desirable for a damper unit to regulate itself independently. For example, it may be desirable in industrial applications to uniformly cushion masses of different sizes with one damper unit. In another example, in modern vehicles, various safety systems intervene to protect occupants in the event of a crash. These include, for example, belt tensioners, airbags or belt force limiters. The belt tensioner first ensures that a belt that may be too loosely fastened is pre-tensioned against the occupant. The airbag is then deployed in very quick succession. In order to protect the occupant's shoulder area and at the same time utilise the airbag to maximum effect, by allowing the belt to yield, that is to say, to be unwound, by a predetermined distance, the belt force limiter ensures that the occupant's head meets the airbag after a certain time and/or a certain distance and that the critical load on the shoulder area is not exceeded.

However, systems known from the prior art are not adapted, or are only adapted through the inclusion of additional sensors, to react to different body weights of occupants and to adjust the force required at the belt force limiter to restrain the occupant in such a way as to ensure that the occupant is not injured, or at least to reduce the risk of injury.

It is therefore the task of the present invention to provide a self-regulating damper unit which can be used, for example, as a belt force limiter, and which is designed to adapt to the occupant's weight.

This task is solved according to the present invention by a self-regulating damper unit comprising a cylinder which is filled with a fluid, a piston which divides the interior of the cylinder into a first working chamber and a second working chamber and which is displaceably disposed in the cylinder, a piston rod which is connected to the piston and which emerges from the cylinder at at least one end thereof, and at least one through-hole which is adapted to place the first working chamber in fluid communication with the second working chamber, characterised in that the damper unit further comprises a shiftable weight which is adapted to modify an available passage cross-section of the at least one through-hole allowing the passage of fluid by a relative movement with respect to the at least one through-hole, the shiftable weight being movably mounted relative to the at least one through-hole such that retardation of the moving piston or the moving piston rod causes enlargement of the passage cross-section of the at least one through-hole.

It should be noted at this point that the expression "modify an available passage cross-section" can include both a partial opening/closing of the passage cross-section and a complete opening/closing of the passage cross-section. In other words, the shiftable weight may be disposed, in a first position, for example the rest position, to at least partially close the through-hole in order to reduce (or prevent) the flow of fluid from one working chamber to the other working chamber to a value corresponding to the available passage cross-section of the through-holes, and in a second position, for example the release position, wherein the shiftable weight is maximally displaced away from the rest position, to release the through-hole at least partially, in particular completely, in order to increase the flow of fluid from one working chamber into the other working chamber.

To explain the principle based on the example of the belt force limiter, the shiftable weight may be disposed on the piston rod in such a way that, upon initial acceleration at the piston rod, the shiftable weight is held in its rest position, the damper unit having a damping force corresponding to the passage cross-section of the at least one through-hole available for the flow of fluid, and that, as soon as acceleration at the piston rod decreases, the shiftable weight is displaced due to its inertia from its rest position towards the release position, so that the passage cross-section is increased and a corresponding damping force of the damper unit is reduced. Naturally, a damper unit according to the invention can be suitably configured for a pressure load on the piston rod, that is to say, pushing of the piston rod into the cylinder of the damper unit.

In this way, a damper unit can be provided which is able to keep the acceleration of the piston rod, that is to say, in the case of the belt force limiter, the belt, constant, regardless of the speed and/or the forces acting on it. An available damper distance can thus be utilised to optimum effect. In the case of the belt force limiter, the damper unit according to the invention allows a heavy person to experience higher forces at the shoulder through the belt than a light person, but the belt speed is reduced by the same amount for the same damper distance regardless of the person's weight. The damper unit can therefore be made occupant-sensitive.

The damper unit according to the invention can, for example, have a stroke of 150 mm and/or allow a movement speed of 15 m/s.

It should also be noted that the damper unit according to the invention can be operated without any power supply. Hence it is possible to provide a fully functional damper unit even in the event of total failure of the on-board power supply. This means that no sensor devices have to be operated with electricity. Nor is any information required from a vehicle sensor system in order to adjust and operate the damper unit depending on the occupant.

It is also conceivable that the piston rod emerges from the cylinder at both longitudinal ends. In such an embodiment, the piston is not disposed at a longitudinal end of the piston rod, but may be disposed, for example, approximately centrally in relation to the length of the piston rod. Thus, for example, the cylinder of the damper unit can be completely filled with fluid. This can reduce turbulence in the damping fluid (for example, oil) during operation of the damper unit, so that the damper unit can be used independent of position, since essentially the cylinder no longer contains any gas.

Furthermore, a compensating reservoir, diaphragm reservoir or similar can be provided. If the reservoir is used in a pressurised working chamber, a valve can be additionally provided. This means that the damper unit can be operated in any position, even with the piston rod emerging from only one end, as the volume compensation is disposed outside the working chamber. This may be especially practicable for twin-tube dampers, diaphragm dampers and the like.

In a further embodiment of the present invention, a seal can be disposed on an outer circumference of the piston to seal the piston against the cylinder. This can prevent fluid from flowing from one working chamber into the other working chamber past an outer circumference of the piston.

Advantageously, an elastic element, in particular a spring, can be connected to the shiftable weight, which is adapted to push the shiftable weight into its rest position. On the one hand, this can ensure that the shiftable weight is actually in its rest position at the start of the piston rod movement, and, on the other hand, the spring rate of the elastic element can be used to set the retardation needed to be able to move the shiftable weight from its position against the spring force of the elastic element towards the release position. It should be generally noted that the rest position and/or the release position can be defined relative to the through-hole. The elastic element can also allow the damper unit to be used multiple times by displacing the shiftable weight back to the rest position after the damper unit has been triggered.

The elastic element connected to the shiftable weight can be adapted to exert a predefined force on the shiftable weight, also when the shiftable weight is in the rest position. This allows a predefined pre-tension to be exerted on the shiftable weight in its rest position, in particular so as to be able to define very precisely the force that is needed to enable the shiftable weight to leave its rest position.

In particular, a stop can be provided against which the elastic element connected to the shiftable weight pushes the shiftable weight. By means of such a stop, the rest position of the shiftable weight can be defined and approached by the shiftable weight in a repeatable manner by means of the elastic element. The stop can be configured, for example, as a projection protruding radially outwards from the piston rod, which in particular can be formed integrally with the piston rod, or as a spring washer engaging in a groove of the piston rod.

Furthermore, with the shiftable weight in the rest position, a predefined portion of the at least one through-opening may remain open for fluid to pass through. This can be realised in particular by the shiftable weight not fully closing the through-opening in its rest position. However, there may also be a fluid connection between the two working chambers which is not obscured by the shiftable weight. In this way, an initial fluid flow can be defined at the start of a movement of the piston rod or piston in the cylinder of the damper unit. However, the shiftable weight can also close the through-opening completely. For this purpose, an additional overflow cross-section should be added at another point in the piston system. In particular, this should correspond to the passage cross-section which otherwise corresponds to the shiftable weight in the maximally closed position. In this way, corresponding cross-sections can be enlarged for a given installation space.

The open-remaining cross-section of the through-opening which is associated with the rest position of the shiftable weight, can be, for example, 1 mm$^2$ to 4 mm$^2$, in particular approximately 2.5 mm$^2$. The fully opened cross-section of the through-opening can be, for example, 4 mm$^2$ to 10 mm$^2$, in particular approximately 6 mm$^2$. The ratio of the fully opened cross-section of the through-opening to the cross-section of the through-opening which is associated with the rest position of the shiftable weight can be, for example, 1 to 10, in particular 1 to 4. Naturally this very much depends on the scaling and intended use of the damper unit, and cross-sections and ratios deviating from the foregoing are also possible within the scope of the present invention.

It is also conceivable that, with the shiftable weight in the rest position, no through-opening remains (even partially) open between the two working chambers. In this case, a compressible damping fluid, for example a gas such as air, could be used in the cylinder of the damper unit according to the invention to provide initial damping. Also, a first portion of a working chamber could comprise a compressible damping fluid and a second portion of the working chamber could comprise an incompressible damping fluid, so that the two functionalities can be combined.

Advantageously, the piston rod can have a longitudinal bore extending over at least part of the length of the piston rod. This longitudinal bore of the piston rod can thus form a portion of the through-hole. In particular, the longitudinal bore can be disposed coaxially with a longitudinal centre axis of the piston rod. Furthermore, the longitudinal bore can also extend in particular into an area where the piston is disposed on the piston rod. In an area of the longitudinal bore at the opposite end to the piston, at least one transverse bore may extend radially outwards with respect to and from the longitudinal bore, so as to place the two working chambers in fluid communication via the longitudinal bore and the at least one transverse bore. In such an embodiment, this transverse bore can then be regarded as the through-hole which is at least partially covered by the shiftable weight in the rest position.

Further through-holes can also be provided which are partially or completely closed by the shiftable weight in its rest position and which are opened by a displacement of the shiftable weight from the rest position to allow a passage of fluid. These further through-holes can be realised both by a plurality of the transverse bores described above and by additional connections of the two working chambers, such as through-holes in the piston, which can be at least partially covered by the shiftable weight in its rest position, for example simultaneously with the at least one transverse bore.

In particular, a further stop can be provided against which the shiftable weight lies when it has been maximally displaced from its rest position. In this position of the maximum through-opening, referred to above as the "release position", a larger passage cross-section is released for the flow of fluid between the two working chambers than when the shiftable weight is in its rest position. This stop can be configured, for example, as a tube projecting from the piston towards the shiftable weight, through whose interior a portion of the piston rod passes.

The damper unit may further comprise an impulse absorber which is in contact with the shiftable weight in an initial rest position. An impulse absorber within the meaning of the present invention is a mass which is able to absorb an initial impulse applied to the shiftable weight in order to avoid releasing the shiftable weight from the stop associated with the rest position of the shiftable weight during initial acceleration of the piston rod. The impulse absorber can be ring-shaped, for example. In this case, the impulse absorber can be mounted with its inner diameter on the tube projecting from the piston towards the shiftable weight which forms the stop for the release position. A predefined gap may be left between the outer diameter of the impulse damper and an inner surface of the wall of the cylinder of the damper unit to allow fluid located between the piston and the impulse damper to flow past the impulse damper. For this purpose, the impulse absorber can also be provided with through-holes and/or with an inner diameter and/or outer diameter that is circumferentially non-circular, for example provided with notches.

For this purpose, the impulse absorber can be connected to an elastic element which pushes the impulse absorber towards the shiftable weight. This means that an impulse applied to the shiftable weight can be transmitted to the impulse absorber in accordance with the conservation of momentum principle, thereby ensuring that the shiftable weight is only displaced from the rest position towards the release position following a correspondingly large retardation of the piston rod, and not already by the initial impulse on the piston rod or on the shiftable weight. The impulse absorber can in particular be supported relative to the piston by means of a spring, the spring being disposed, in particular, radially outside the above-mentioned tube, which serves as a stop for the shiftable weight in the release position. Thus, in an exemplary embodiment, the sequence in a radial direction could begin with the piston rod, then the elastic element connected to the shiftable weight, followed by the stop for the release position of the shiftable weight, the elastic element connected to the impulse absorber and, finally, a wall of the cylinder of the damper unit. In particular, the spring rate of the elastic element of the impulse absorber can be much smaller than the spring rate of the elastic element connected to the shiftable weight. The preload force with which the elastic element pushes or presses the impulse absorber towards the shiftable weight can, for example, be configured in such a way that it just exceeds the force due to gravity of the impulse absorber. This ensures that, regardless of the orientation of the damper unit in the installed state, the impulse absorber lies against the shiftable weight. It further ensures that, after displacement from the position in which the impulse absorber lies against the shiftable weight, the impulse absorber can be displaced back to this position.

At the same time, a surface of the shiftable weight which is adapted to come into contact with the impulse absorber and/or a surface of the impulse absorber which is adapted to come into contact with the shiftable weight can be provided with a texture 56 (See. FIG. 1) whereby a surface adhesion is definable between the shiftable weight and the impulse absorber. This texture 56 (See. FIG. 1) of at least one of the two contacting surfaces should be particularly suitable for reducing surface contact and therefore adhesion of the two surfaces to one another, because, if an impulse is transmitted from the shiftable weight to the impulse absorber, the impulse absorber must be easily able to separate itself from the shiftable weight. For example, at least one of the two contact surfaces may be provided with a texture in the form of a face spline profile.

It may also be desirable that the impulse absorber does not separate from the shiftable weight immediately upon receiving the initial impulse. For example, a predefined setting of the surface adhesion between the impulse absorber and the shiftable weight can ensure that the shiftable weight is "carried along" by the impulse absorber, at least over an initial range, so that the shiftable weight can be displaced from its rest position as soon as the initial impulse is initiated.

At this point it should be noted that the features and effects described in relation to the impulse absorber/shiftable weight pairing can also apply to surface contact between the shiftable weight and the stop.

The shiftable weight may be non-rotatably mounted on the piston rod, and/or the shiftable weight may have a groove on its inner surface which is adapted to establish fluid communication between the through-hole and the working chamber in which the shiftable weight is disposed, independently of a rotational orientation of the shiftable weight relative to the piston rod. Due to such a configuration of the damper unit, a movement or acceleration of the shiftable weight from and/or to the rest position can be clearly defined, because unintentional covering of the at least one through-opening can be avoided.

To be able to mount the shiftable weight on the piston rod so as to be non-rotatable, the shiftable weight can have a projection 52 (See FIG. 1) that engages in a recess, in particular a groove 54 (See FIG. 1), disposed on the piston rod.

In a further aspect, the present invention relates to a seat belt unit, in particular for a vehicle, comprising a seat belt and a self-regulating damper unit according to the invention, wherein the seat belt is directly or indirectly connected to one of the piston rod and the cylinder, and the other of the piston rod and the cylinder is connected to a higher-level assembly, in particular a vehicle body. With reference to the description given at the outset, the self-regulating damper unit according to the invention can be used as a belt force limiter for a seat belt in vehicles, wherein the damper unit according to the invention allows occupant-sensitive damping, that is to say, damping which automatically adjusts to an occupant's weight.

The expression "directly or indirectly connected" should be understood to mean that, for example, the piston rod does not have to be in direct contact with the safety belt as long as there is a force-transmitting connection between the two elements. Thus, the connection of the seat belt with the damper unit according to the invention, for example with respect to a 3-point belt, can be realised at at least one of the seat belt fixing points. More specifically, in a first example, the damper unit can be used in the (lower in the motor vehicle) attachment of the belt and/or in the area of the belt buckle and/or on a section associated with the belt retractor. In the section associated with the belt retractor, the damper unit according to the invention can be disposed, for example, between the vehicle body and a housing which can comprise further conceivable components of the seat belt unit, such as a belt tensioner, non-return device, etc. This housing can be displaceable in a guide, such as a sliding-block guide.

The present invention is described in greater detail below with reference to the accompanying drawings. These show the following:

FIG. 1 A side cross-sectional view of an embodiment of the damper unit according to the invention.

In FIG. 1, a damper unit according to the invention is generally designated by the reference number 10. The damper unit 10 comprises a cylinder 12 in which a piston 14 is disposed. The piston 14 comprises a sealing device 16 on its outer periphery which seals against an inner surface of the wall of the cylinder 12, so that an inner space of the cylinder 12 is divided by the piston 14 into a first working chamber 18 and a second working chamber 20. The inner space of the cylinder 12, comprising the two working chambers 18 and 20, is filled with a fluid, for example oil.

Before further describing the embodiment of the damper unit 10 according to the invention shown in FIG. 1, it should be noted that the damper unit 10 according to FIG. 1 is adapted to receive a pressure load, that is to say, for a piston rod 22 connected to the piston 14 to be pushed into the cylinder 12 (and displacement of the piston 14 towards the right in FIG. 1).

At the end of the cylinder 12 at which the piston rod 22 emerges from the cylinder 12, the first working chamber 18 is sealed in a fluid-tight manner against an outer side of the damper unit 10 by a further sealing device 24.

A shiftable weight 26 is disposed on the piston rod 22 in such a way that it can be displaced in the longitudinally extending direction of the piston rod 22. In the illustrated exemplary embodiment, the shiftable weight 26 is also disposed so as to be rotatable relative to the piston rod 22. The shiftable weight 26 is pushed against a stop 30 by a spring 28, which is supported at one longitudinal end by the shiftable weight 26 and at its other longitudinal end by the piston 14. The stop 30 defines and limits a rest position of the shiftable weight 26 when the shiftable weight 26 is in contact with the stop 30. The stop 30 is configured here as a spring washer which engages in a groove running circumferentially in the piston rod 22. The spring 28 directly surrounds the piston rod 22, without however lying against the piston rod 22.

A tube 32 is connected to the piston 14 and extends from the piston 14 towards the shiftable weight 26, whereby, when the shiftable weight 26 has been displaced from the release position in such a way that it comes into contact with the tube 32, the longitudinal end of the tube 32 opposite the piston 14 defines and limits a release position of the shiftable weight 26. The spring 28 is disposed within the tube 32 as viewed in the radial direction of the damper unit 10.

Coaxially with a centre line X of the piston rod 22, a longitudinal bore 34 is disposed in the piston rod 22, which on the one hand opens into the second working chamber 20 at the end of the piston rod 22 at which the piston 14 is disposed, and which on the other hand ends as a blind hole in an area of the piston rod 22 which is radially overlaid by the shiftable weight 26 in its rest position. Through-holes 36 extend radially outwards from the longitudinal bore 34 to the piston rod 22 such that they are (in this embodiment, partially) covered by the shiftable weight 26 in its rest position.

The shiftable weight 26 has a circumferential groove 38 in its interior from which, again, holes 40 extend radially. In this way, the holes 40, the groove 38, the through-holes 36 and the longitudinal bore 34 place the first working chamber 18 and the second working chamber 20 in fluid communication with each other. A passage cross-section 42 associated with the rest position of the shiftable weight 26 is defined by the only partial overlapping of the through-holes 36 by the shiftable weight 26. Due to the circumferential groove 38, the function of overlapping is decoupled from a rotational orientation of the shiftable weight 26 relative to the piston rod 22.

If a sudden impact is now applied to the piston rod 22 so that the piston 14 is displaced to the right in the damper unit 10 shown in FIG. 1, the shiftable weight 26 is pressed against the stop 30 due to its inertia and due to the preload by the spring 28, and fluid flows from the second working chamber 20 into the first working chamber 18, the flow rate being limited by the passage cross-section 42. If a displacement of the piston rod 22 and thus of the shiftable weight 26 is delayed, due to its inertia the shiftable weight 26 is displaced from its rest position towards its release position, that is to say, it comes out of contact with the stop 30, as a result of which the passage cross-section 42 is increased, since, due to the displacement of the shiftable weight 26, the holes 40 or the groove 38 of the shiftable weight 26 are brought into greater overlap with the through-holes 36 which, in relation to the rest position of the shiftable weight 26, are disposed closer to the piston 14 than the holes 40 or the groove 38 of the shiftable weight 26. In its release position, in which the shiftable weight 26 lies against the tube 32, the holes 40 or the groove 38 are brought into maximum overlap with the through-holes 36.

An increase in the passage cross-section 42 causes an increase in the flow rate of the fluid flowing from the second working chamber 20 into the first working chamber 18, thereby reducing the overall damping force of the damper unit 10. When the retardation at the piston rod 22 decreases, the shiftable weight 26 is displaced back towards the rest position due to the action of the spring 28, again reducing the passage cross-section 42 and increasing the damping force of the damper unit 10.

In order to prevent the first impulse which is introduced into the piston rod 22 from displacing the shiftable weight 26 away from the stop 30 (in particular due to elasticities of the materials used for the shiftable weight 26 and/or the stop 30 (for example, metal)), the embodiment shown here includes an impulse absorber 44 which is in contact with the shiftable weight 26 when the shiftable weight 26 is in the rest position, and which is adapted to absorb an impulse initially introduced into the shiftable weight 26 and to move away from the shiftable weight 26 towards the piston 14 due to this impulse, so that the shiftable weight 26 can (at this point in time) remain in its rest position. To ensure, for this purpose, that the impulse absorber 44 lies against the shiftable weight 26, the impulse absorber 44 is preloaded towards the shiftable weight 26 by means of a spring 46, which is supported on the piston 14 at its opposite end from the pulse absorber 44.

Here, the impulse absorber 44 is ring-shaped and is mounted with its inner diameter on an outer surface of the tube 32 so that it can move in translation and rotation. The spring 46 connected to the impulse absorber 44 is disposed radially outside the tube 32.

To be able to connect the piston 14 to the piston rod 22, a limiting element 48 is provided on the piston rod 22, which here too is configured as a spring washer which engages in a groove of the piston rod 22, the limiting element 48 being adapted to limit a displacement of the piston 14 towards the shiftable weight 26. On its side opposite to the limiting element 48, the piston 14 is secured in its position against the limiting element 48 by a securing element 50, such as a nut.

It should be added that the shiftable weight 26 here is essentially bell-shaped, so that it has a larger diameter in an area in which the shiftable weight 26 lies against the impulse absorber 44 than in an area in which the shiftable weight 26 lies against the stop 30. This can prevent a flow of fluid from or into the first working chamber 18 from being restricted by an excessively narrow gap between the holes 40 and an inner surface of the wall of the cylinder 12 in addition to the passage cross-section 42, and possibly being thereby more restricted than by the passage cross-section 42, which could negatively affect or even prevent the operation of the damper unit 10 according to the invention.

The invention claimed is:

1. A self-regulating damper unit, comprising:
   a cylinder filled with a fluid;
   a piston dividing an interior of the cylinder into a first working chamber and a second working chamber, wherein the piston is displaceably disposed in the cylinder;
   a piston rod connected to the piston and emerging from the cylinder at one or more ends of the cylinder;
   at least one through-hole configured to place the first working chamber in fluid communication with the second working chamber;

a shiftable weight configured to modify a passage cross-section of the at least one through-hole available for the passage of fluid due to a relative movement with respect to the at least one through-hole, wherein the shiftable weight is movably mounted relative to the at least one through-hole such that retardation of the moving piston or the moving piston rod causes enlargement of the passage cross-section of the at least one through-hole;
an elastic element connected to the shiftable weight, wherein the elastic element is configured to push the shiftable weight into a rest position; and
a stop, wherein the elastic element connected to the shiftable weight pushes the shiftable weight against the stop.

2. The self-regulating damper unit of claim 1, wherein a seal is disposed on an outer circumference of the piston, wherein the seal seals the piston against the cylinder.

3. The self-regulating damper unit of claim 1, wherein the elastic element connected to the shiftable weight is configured to exert a predefined force on the shiftable weight when the shiftable weight is in the rest position.

4. The self-regulating damper unit of claim 1, wherein, with the shiftable weight in the rest position, a predefined portion of the at least one through-opening remains open for fluid to pass through.

5. The self-regulating damper unit of claim 1, wherein the piston rod comprises a longitudinal bore extending over at least part of the length of the piston rod.

6. The self-regulating damper unit of claim 1, further comprising additional through-holes that partially or completely closed by the shiftable weight in the rest position of the shiftable weight and that are opened for the passage of fluid by a displacement of the shiftable weight from the rest position.

7. The self-regulating damper unit of claim 1, further comprising a further stop, wherein the shiftable weight lies against the further stop when the shiftable weight has been maximally displaced from a rest position of the shiftable weight.

8. The self-regulating damper unit of claim 1, further comprising an impulse absorber, wherein the impulse absorber is in contact with the shiftable weight in an initial rest position.

9. The self-regulating damper unit of claim 8, wherein the impulse absorber is connected to an elastic element, wherein the elastic element pushes the impulse absorber towards the shiftable weight.

10. The self-regulating damper unit of claim 8, wherein a surface of the shiftable weight which is configured to come into contact with the impulse absorber comprises a texture whereby a surface adhesion is definable between the shiftable weight and the impulse absorber.

11. The self-regulating damper unit of claim 10, wherein coming into contact with the impulse absorber comprises coming into contact with a surface of the impulse absorber configured to come into contact with the shiftable weight.

12. The self-regulating damper unit of claim 1, wherein the shiftable weight is non-rotatably mounted on the piston rod.

13. The self-regulating damper unit of claim 12, wherein the shiftable weight, when the case in which the shiftable weight is secured against rotation relative to the piston rod, comprises a projection that engages in a recess disposed on the piston rod.

14. The self-regulating damper unit of claim 13, wherein the recess comprises a groove.

15. The self-regulating damper unit of claim 1, wherein the elastic element comprises a spring.

16. The self-regulating damper unit of claim 1, wherein the shiftable weight has a groove on its inner surface, wherein the groove is adapted to establish fluid communication between the through-hole and the working chamber in which the shiftable weight is disposed, independently of a rotational orientation of the shiftable weight relative to the piston rod.

17. A seat belt unit, comprising:
a seat belt; and
a self-regulating damper unit, comprising:
    a cylinder filled with a fluid;
    a piston dividing an interior of the cylinder into a first working chamber and a second working chamber, wherein the piston is displaceably disposed in the cylinder;
    a piston rod connected to the piston and emerging from the cylinder at one or more ends of the cylinder;
    at least one through-hole configured to place the first working chamber in fluid communication with the second working chamber; and
    a shiftable weight configured to modify a passage cross-section of the at least one through-hole available for the passage of fluid due to a relative movement with respect to the at least one through-hole, wherein the shiftable weight is movably mounted relative to the at least one through-hole such that retardation of the moving piston or the moving piston rod causes enlargement of the passage cross-section of the at least one through-hole;
    an elastic element connected to the shiftable weight, wherein the elastic element is configured to push the shiftable weight into a rest position; and
    a stop, wherein the elastic element connected to the shiftable weight pushes the shiftable weight against the stop, wherein:
    the seat belt is directly or indirectly connected to the piston rod and the cylinder is connected to a higher-level assembly; or
    the seat belt is directly or indirectly connected to the cylinder and the piston rod is connected to the higher-level assembly.

18. The seat belt unit of claim 17, wherein the higher-level assembly comprises a vehicle body.

* * * * *